Aug. 20, 1968    H. WEGENER    3,397,839
DEVICE FOR INDICATING AND COMPUTING GAME SCORES
Filed March 28, 1967    3 Sheets-Sheet 1

INVENTOR.
HEINRICH WEGENER

United States Patent Office 3,397,839
Patented Aug. 20, 1968

3,397,839
DEVICE FOR INDICATING AND COMPUTING GAME SCORES
Heinrich Wegener, Gruneburgweg 115,
Frankfurt am Main, Germany
Filed Mar. 28, 1967, Ser. No. 626,514
Claims priority, application Germany, Mar. 29, 1966,
W 41,244; Jan. 19, 1967, W 43,178
16 Claims. (Cl. 235—91)

ABSTRACT OF THE DISCLOSURE

The disclosure is directed to a device for indicating and computing game scores using pointers displaceable over scales, although other indicating means such as movable scales, light marks, or the like can be used. A housing is provided with one scale, and preferably with several scales, and indicating elements are arranged for displacement over the scales and are connected with setting elements in the housing. Each scale has a zero reference intermediate its ends, and the setting means are operable to displace the indicating elements relative to the zero scale in either a plus or minus direction. Counting mechanisms are associated with each scale, and their indications are visible through a window or aperture in the housing. These counting mechanisms are selectively operated by the associated setting elements whether the setting elements are moving the indicating elements in a plus direction or in a minus direction. Each counting mechanism is provided with a zero reset key.

In a modification of the invention, instead of one counting mechanism being associated with each scale, a counting mechanism may be associated with two or more scales and be selectively connectable to the setting elements of the respective scales.

As a further feature of the invention, suitable means, such as a displaceable scale, is provided whose zero indication may be set at the lowest score, and a marker extending transversely of all the scales may then be used, in association with the displaceable scale, to read the other scores as differences between the lowest score and each one of the respective other scores. A further feature of the disclosure is the provision of dealer indicating means stepped in response to the actuation of the zero reset key of a counting mechanism. These indication means may comprise colored lights, colored disks, or the like.

Background of the invention

In most card games or the like, the outcome of the game is determined by totalling and writing down the scores for each player and for each game. The winner of a series of games is determined by adding, for each one of several players, the scores in each of the games, and comparing the total scores of all of the players. This marking and comparison of the individual scores is usually done with a pencil and paper, resulting in a considerable expenditure of effort in computing. A constant and exact control of the scores during a series of games, and a constant determination of the relative standings of the players during the series of games, is not substantially possible.

To remedy this difficulty, devices have been proposed for setting down the scores and comparing the scores by using mechanical elements and suitable setting means. Such devices are shown, for example, in U.S. Patent No. 2,537,430, British Patent No. 760,954, and German Patent Nos. 48,720 and 448,837. In addition to the simplest forms of construction using number-bearing tapes extending passed sight windows, there are also known constructions wherein the scores are set starting from zero each time, and are automatically either added to or substracted from previous scores of the same players. Devices of this latter type comprise tapes with clamping elements and in which the played scores are set along a scale starting from zero after clamping of the tapes.

Other constructions involve disk-shaped devices which have, adjacent the scale divisions, a corresponding number of holes for receiving plug-in pegs and against which scale stops may engage. In any event, the known devices are expensive in construction, difficult to handle, and do not, especially if they are set with clamping or sliding elements, always insure a correct indication and setting.

Summary of the invention

The present invention is directed to devices for indicating and computing game scores and, more particularly, to a novel and improved device which provides a simple retention, setting and clear indication of scores, provides for addition or subtraction of scores, and provides for determination of the final result of a series of scores while using very simple constructions. In a special form of construction, the correct dealer sequence is indicated automatically with each setting of a score.

In accordance with the present invention, such a device includes indicating elements, such as pointers, scales, light marks, or the like, displaceable relative to numerical scales. In addition, a fixed marking, such as a scale or a zero position, has associated therewith a displaceable indicating means, such as a spindle operatively connected to a spindle nut and pointer, or a rotatable cylinder having a single turn helical marking. This indicating means is arranged to be coupled with a counting mechanism which is settable to zero after each counting operation.

Preferably, the spindle or cylinder is designed for rotation in opposite directions so that, with proper coupling with the counting mechanism, both addition and substraction of scores can be effected. A housing may contain several counting mechanisms, spindles or cylinder units, but it is also possible to provide each counting unit in a separate housing. Then the individual housings, which are preferably made of plastic, are advantageously provided with connecting elements, such as tongues and grooves or the like, so that they may be combined in counting blocks in dependence on the number of players.

For the purpose of comparison of the final scores of a series of games, at least one adjustable scale having displaceable indicating elements is provided in addition to the fixed indicating or setting scales. Associated with this adjustable scale are indicating elements whereby score reading errors can be avoided.

As an alternative, for the purpose of comparing final scores, each counting unit may have permanently connected with its spindle or cylinder an additional counting mechanism connected, for example, at the other end of the spindle or cylinder. This additional counting mechanism adds and subtracts all set scores, whether plus or minus, and thus numerically indicates the status of each individual player in the game.

The score setting and game status indication provided by the invention device well now be explained with reference to a counting unit including a rotatable spindle. At the beginning of the series of games, the adjustable indicating elements, including one for each player are set to the zero value of the stationary scales, which zero value is located at the center of each scale. The counting mechanism is set to zero by pressing a key or a button.

After the score of a player has been determined, the indicating element corresponding to the particular player is coupled with the respective counting mechanism and the value of this player's score is set in the counting mechanism. Due to the coupling of the spindle with the counting mechanism, there is effected, at the same time, the setting of the associated indicating element along the respective scale. After such setting has been completed, the counting mechanism is reset to zero while the indicating element remains at the set value. This operation is repeated for each player at the end of each game, and is repeated for each of the successive games so that scores are automatically added and subtracted by appropriate movement of the indicating elements.

The setting of the counting mechanism to zero has the advantage that the numbers need no longer be added or subtracted mentally, which is inconvenient and may result in the possibility of errors which are difficult to control. The invention device thus not only affords a simple and exact retention of the scores of an individual player, but also each player can, at any time, advantageously inform himself on his status in the total series of games at one glance, as the indicating elements always show separately the instantaneous total score of all games for each individual player.

By the exact coupling by means of gears, when using spindles as well as when using indicating cylinders, an error-free setting and indication are insured. To indicate clearly when a player's score enters the minus range, contacts may be provided at the zero points of the scales to trigger acoustical or optical signals as the indicating elements pass zero in a substracting direction.

To determine the final result of an entire series of games, the invention device may be provided further with a movable scale having displaceable indicating elements. If, for example, the difference between the total scores of two players is to be determined, this displaceable scale is set with its zero point corresponding to the lower score of the two players. By proceeding horizontally or transversely of the scales from the higher score of the other player to the settable scale, there can be read directly, on the settable scale, the difference between the two scores. This operation can be carried out for comparison of all scores simply by corresponding adjustments of the displaceable scale. Advantageously, of course, this settable scale is set with its zero value directly at the lowest score, so that there can be read immediately, without further adjustment of the settable scale, the difference between the lower score and the scores of the other players, such as the scores of three other players.

Advantageously, the device includes means for indicating a dealer sequence and which may be connected to the zero setting key of the counting mechanisms so that, as the zero setting keys are actuated at the end of each game, there is a pulse transmitted which is useable to effect an automatic indication of the dealer sequence.

Of course, the invention device can also be used for simple addition or subtraction, as in sales, transactions.

An object of the present invention is to provide a novel and improved device for indicating and computing game scores.

A further object of the invention is to provide such a device comprising a housing having at least one fixed scale with indicating elements displaceable over the scale and connected with setting elements arranged in the housing.

A further object of the invention is to provide such a device by means of which the total scores at the end of a series of games may be readily compared.

Still another object of the invention is to provide such a device which continually indicates the relative status of each player during a series of games.

A further object of the invention is to provide such a device which indicates automatically the dealer sequence in a series of hands or games.

Yet another object of the invention is to provide such a device in which each fixed scale has associated therewith a rotatable threaded spindle and an associated nut having an indicator, or a rotatable cylinder having a helical marking extending therealong.

A further object of the invention is to provide a device of the type just mentioned including a counting mechanism selectively coupled to the spindle or cylinder for operation during rotation of the spindle or cylinder in moving the associated indicating device or helical marking to the proper position on the scale.

Another object of the invention is to provide such a device in which several scales with associated counting mechanisms may be mounted in one housing, or in which each scale and an associated counting mechanism may be mounted in a respective housing and the respective housings may be provided to be coupled together in accordance with the number of players to be engaged in a game.

*Brief description of the drawings*

For an understanding of the principles of the invention, reference is made to the following description of typical embodiments thereof as illustrated in the accompanying drawings.

In the drawings.

*Description of the preferred embodiments*

Figure 1:
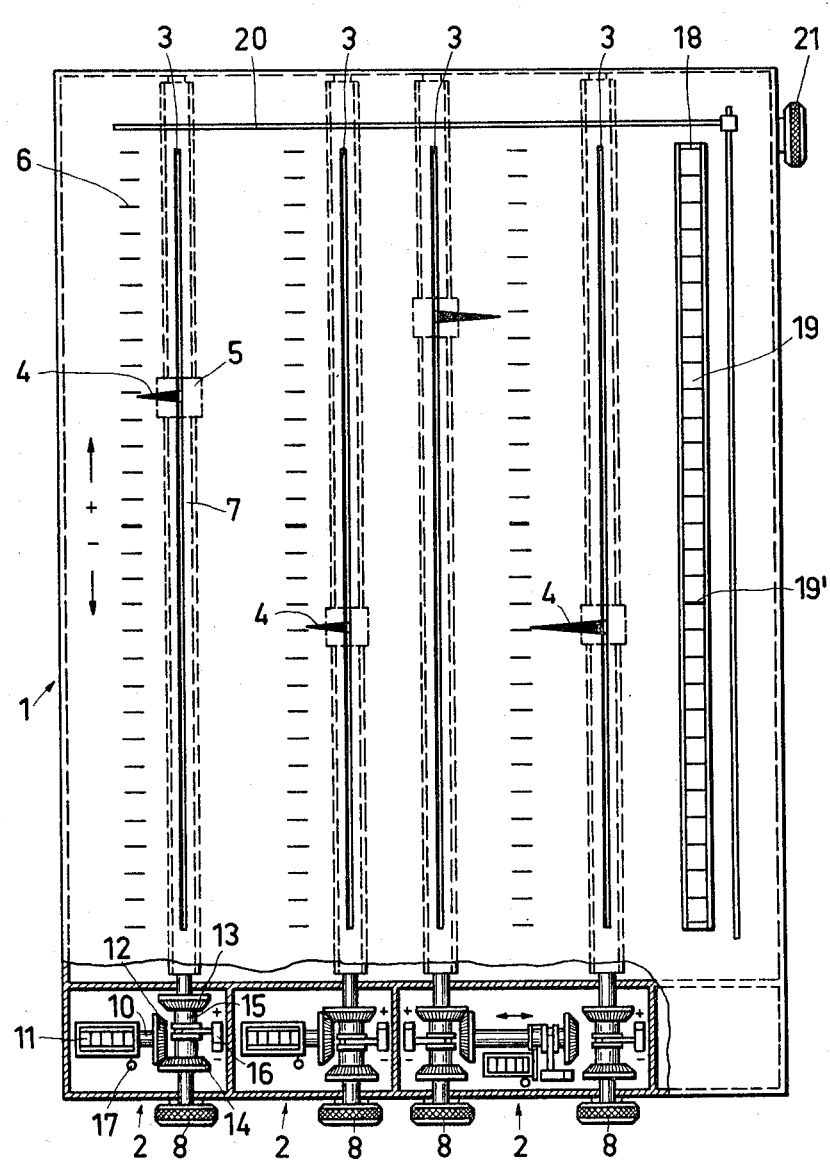
FIG. 1 is a plan view, partly broken away and in section, of one form of device embodying the invention.

Referring to FIG. 1, a housing 1 has mounted therein four counting mechanisms 2 each including a slot 3 for an indicating pointer 4 mounted on a spindle nut 5 and and movable along a respective scale 6. Each scale 6 has a zero point at the center thereof as indicated by the plus and minus signs and the arrows adjacent the left-hand scale 6. Spindle nuts 5, which are non-rotatable, are threaded on threaded spindles 7 which, in the regions of their drives, are not threaded. The ends of these spindles project from the housing and carry knurled setting disks or knobs 8.

While the driving zones are shown uncovered in FIG. 1, there is visible simply a sight window for the reading of a counting mechanism 11, an opening for the zero setting buttons 17 for the respective counting mechanisms 11, and an opening for the add and subtract setting levers 16 of the counting mechanisms. The setting shaft 10 of each counting mechanism 11 has secured thereto a bevel pinion 12 which meshes, depending on the position of the associated setting lever 16, with either a bevel gear 13 or a bevel gear 14, which bevel gears 13 and 14 are fixed on an axially displaceable bushing 15 which is rotatable with the associated spindle 7. This bushing 15 can be adjusted by setting lever 16 to provide either an "add" coupling or a "subtract" coupling.

Alternatively, each spindle and its associated bevel gears may be separated and selectively coupled by a connection which is axially displaceable but fixed against rotation, so that coupling of the bevel gears can be effected by a corresponding short axial displacement of setting disks or knobs 8. In this case, it is possible to construct each setting disk or knob in two parts and with different color markings. Upon axial displacement of a setting disk or knob 8, the inner part, which is connected with the spindle, then projects slightly from the outer part and thus indicates the "add" or "subtract" coupling between the counting mechanism and the associated spindle.

Adjustment of pointers 4 is effected by rotation of setting knobs 8, which are rotated until the score to be set, or to be respectively added or subtracted, appears as an indication at the window of the counting mechanism 11. If a value is to be subtracted, the counting mechanism 11 is coupled to the spindle in the manner described. Each counting mechanism 11 may be reset to zero by a push button or key 17 after a game score has been set on the appropriate scale.

As the counting mechanisms are advantageously always set to zero after each score setting, it is possible to use, for two spindles, only one counting mechanism. In this case, the counting mechanism must be provided with a displaceable pair of bevel pinions so that the counting mechanism can be coupled with either one of two spindles. Such an arrangement is shown for the two righthand counting units of FIG. 1. The counting and setting process for these latter two units is, in principle, the same as that described for the two lefthand counting units.

In addition to the scale and slot arrangements 3–6, the housing may be formed with a further slot 18 along which there extends an adjustable scale 19 having the same scale divisions as scales 6. If, after completion of a series of games, the total scores of the individual players are to be compared one with another, adjustable scale 19 is set with its zero value 19' laterally aligned with the respective lower score of two scores. The difference between the two scores to be compared can be simply determined by reading, on scale 19, the value on scale 19 corresponding laterally to the higher score on a scale 6.

Advantageously, a preferred procedure is to first set the zero value 19' of a scale 19 to the lowest score of all of the indicating elements 4, so that the difference values corresponding to each higher score can be read without further adjustment of scale 19 and directly. To facilitate the reading of these difference values, the housing is provided with a displaceable transfer strip or cross indicator 20 by means of which the respective values of scales 6, as set by indicating pointers 4, can be transmitted to the adjustable difference values scale 19. Of course, strip 20 and pointers 4 must be so mutually arranged and designed that they do not interfere with each other during relative adjustment. Scale 19 may be adjusted, for example, by a setting disk or knob 21 projecting laterally from housing 1.

Housing 1 may contain more than the illustrated number of counting units and, as has been mentioned, it is also possible to mount each counting unit by itself, or pairs of counting units in smaller housings. Several of the smaller housings, depending on the number of participating players, can then be readily coupled together by means of tongue and groove joints, for example. Additionally, scales 6 may be so arranged that only one scale is positioned between each two counting units.

Figure 2:
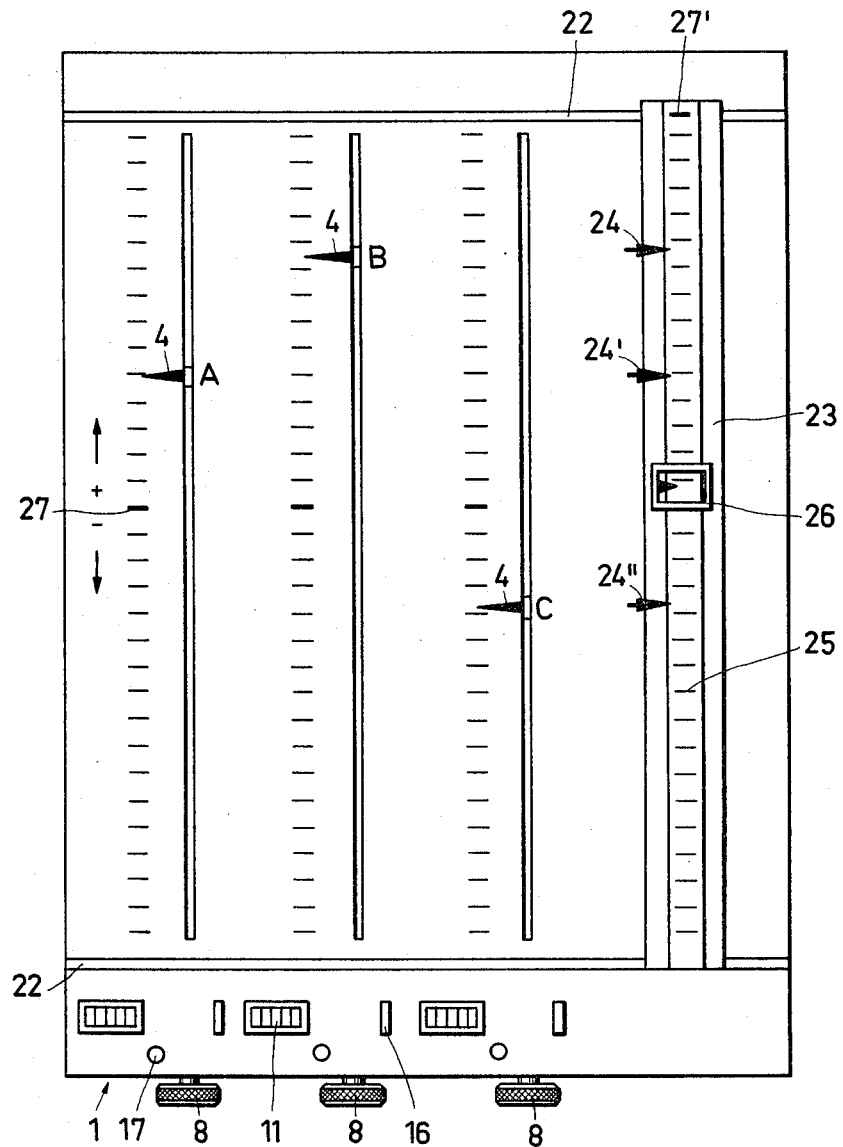
FIG. 2 is a plan view of another form of device embodying the invention.

FIG. 2 illustrates an alternative form of construction in which, for the final evaluation of the total scores, there is provided a scale carrier 23 displaceable laterally of the housing in grooves 22. This scale carrier is provided with displaceable riders 24, 24' and 24" and carries a scale strip 25, in the form of an endless flexible tape, which is displaceable longitudinally thereof and is manually operatively associated with a slide 26.

Final comparison of the total scores is effected in the following manner with the arrangement shown in FIG. 2. For three players, for example, let there be assumed that there are the total scores A, B and C as indicated by pointers 4 above and below the zero value markings 27. Scale carrier 23 is now pushed to the left until it is adjacent the score value A. Rider 24' is set to this value A. Next value B is "read out" by corresponding adjustment of rider 24, and value C is "read out" by corresponding adjustment of rider 24". This position of the three markers 24, 24' and 24" is illustrated in FIG. 2. Scale strip 25 is now longitudinally adjusted until its zero value 27' is opposite pointer 24'. Thus, using slide 26, value C is set on scale strip 25. Scale 25 is now adjusted, together with slide 26, until slide 26 is opposite rider 24. At rider 24", there can then be immediately read the final score of player C compared to his partners. Thereafter, scale strip 25 is adjusted to set its zero value 27' adjacent rider 24', and slide 26 is adjusted relative to scale strip 25 until it is opposite rider 24". The scale strip 25 together with slide 26 is then adjusted until slide 26 is adjacent rider 24'. The final score of player A is then read at rider 24 on scale strip 25.

The final score of player B is calculated by setting scale strip 25 so that its zero value 27' is opposite pointer 24. Slide 26 is now adjusted along scale strip 25 until it is opposite pointer 24' with zero value 27' remaining opposite pointer or rider 24. The final score can now be read on scale strip 25 opposite pointer 24".

With the described design of the counting value units, there may be provided, instead of the threaded spindle, a cylinder having a length equal to an associated scale, and this cylinder may be provided with a single helical turn which, during rotation of the cylinder, "runs" upwardly or downwardly past the scale markings.

As mentioned, each counting mechanism 11 is reset to zero, after each game score has been set, by operation of reset push button or lever 17. By virtue of the presence of these zero reset push buttons 17, the device can be used for indicating the dealer sequence. This is easily effected by providing, in association with each zero reset key 17, electrical contacts included in a circuit for indicating the dealer sequence.

Figure 3:
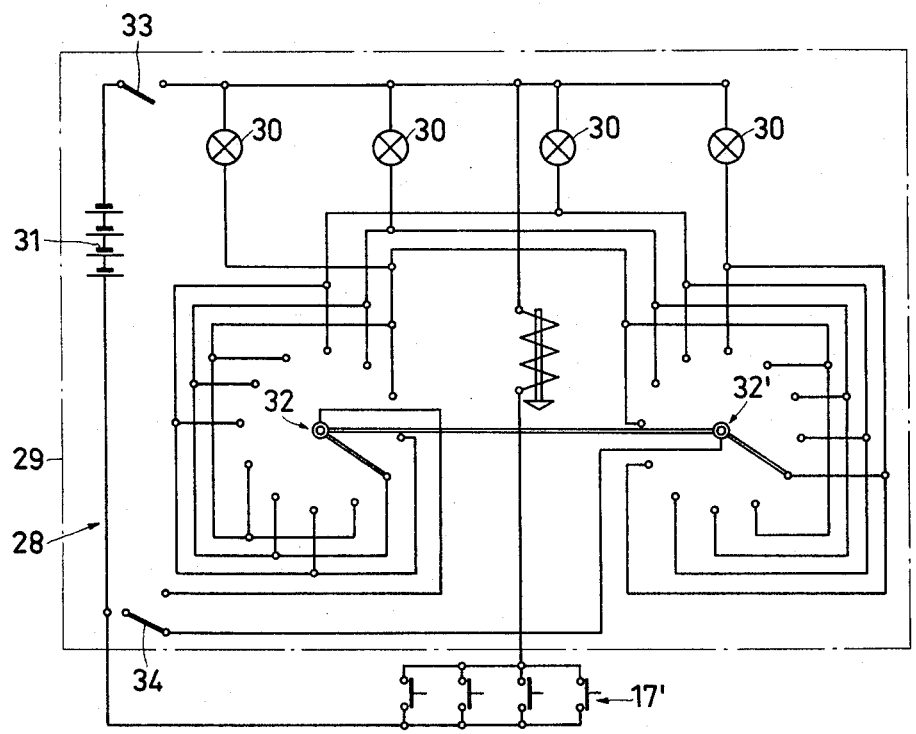
FIG. 3 is a schematic wiring diagram illustrating circuit arrangements for indicating the dealer sequence.

Referring to FIG. 3, contacts 17' are associated with push buttons 17 in such a way that they are closed momentarily upon operation of the respective push button 17. Through a circuit to be described presently, lamps of different colors indicating the dealer sequence are successively lit. Advantageously, the dealer sequence indicating equipment is included in a housing 29 which, per se, can be installed at a suitable location in housing 1. For this purpose, housing 1 can be provided, in the area where housing 29 is positioned, with apertures through which the colored lamps 30 are visible.

The electrical circuit for indicating the dealer sequence comprises essentially a current source 31, at least one stepping mechanism 32, 32', and an on-off switch 33 for switching the entire equipment on and off. Depending on the number of participating players, an additional step-switching mechanism 32' may be provided which, compared with mechanism 32 controlling three lamps, is connected to control four lamps. When two or more such switching mechanisms are present, a corresponding reversing or selecting switch 34 must be provided. As the elements of such a circuit are known, they require no further explanation and it is believed that the function of the circuit will be clear upon inspection.

It is also possible to provide the dealer sequence indication using mechanical means. In such case, levers can be provided to extend from keys 17 to a multi-colored disk which, with every operation of a key 17, is angularly advanced by one color field so that the color fields appear successively in a corresponding sight window of housing 1.

Figure 4:
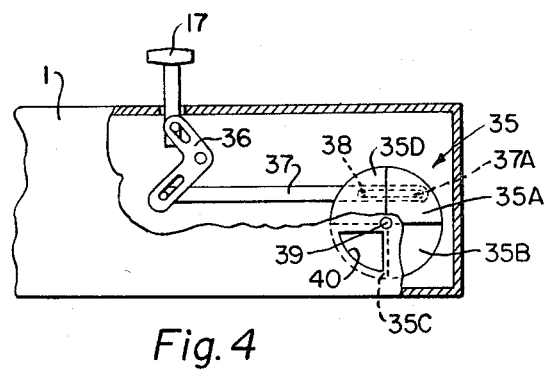
FIG. 4 is a somewhat schematic partial elevation and partial sectional view illustrating a mechanical arrangement for indicating the dealer sequence.

Referring to FIG. 4, a multi-colored disk 35 is rotatably mounted on a pin 39 in the front wall of housing 1, and disk 35 is divided into differently colored sectors such as the four sectors 35A, 35B, 35C and 35D shown by way of example. Each key 17 is linked to one slotted arm of a respective crank 36, and the other slotted arm of the respective crank 36 is linked to an elongated lever 37 having a slot in its other end. The slots of all of the levers 37 engage over a pin 38 secured to disk 35. A sector-shaped window 40, which may be in the form of an aperture, is provided in the front wall of housing 1.

In the arrangement shown in FIG. 4, each time a reset key 17 is depressed, disk 35 is rotated through 90° by virtue of the associated crank 36 and lever 37. Suitable means may be provided to prevent reverse rotation of disk 35, such means being well known to those skilled in the art, such as a ratchet and locking pawl arrangement. The slotted levers 37 permit each of the reset keys 17 to operate disk 35 independently of the other levers 17.

While specific embodiments of the invention have been shown and described to illustrate the application of the principles of the invention, it will be understood that the invention may be embodied otherwise without departing from such principles.

What is claimed is:

1. A device for indicating and computing game scores comprising, in combination, a housing provided with at least one relatively fixed scale extending therealong and having a zero indication at substantially its midpoint; an indicator displaceable longitudinally of said scale; a rotatable setting element extending longitudinally of the scale and operable, during rotation to move said indicator along said scale; a setting means operable to rotate said setting element; a counting mechanism having a zero reset key operable to reset the counting mechanism to zero after each counting operation thereof; and means selectively operable to couple said counting mechanism to said setting element for operation by rotation of said setting element.

2. A device for indicating and computing game scores, as claimed in claim 1, in which said setting element comprises a threaded spindle having a non-rotatable spindle nut threaded thereon and carrying said indicator.

3. A device for indicating and computing game scores, as claimed in claim 1, in which said setting element comprises a rotatable cylinder extending throughout the length of said scale and having thereon a single turn helical line constituting said indicator.

4. A device for indicating and computing game scores, as claimed in claim 1, in which said coupling means is a selectively operable coupling means operable to operate said counting mechanism in the same direction for both directions or rotation of said setting element.

5. A device for indicating and computing game scores, as claimed in claim 1, in which said counting mechanism is operatively associated with two adjacent setting elements each associated with a respective scale; and second coupling means selectively operable to couple said counting mechanism to either of said setting elements.

6. A device for indicating and computing game scores, as claimed in claim 1, in which said counting mechanism includes a setting shaft having a first bevel gear fixed thereto, said setting shaft extending perpendicularly to the axis of said setting element adjacent the driving end of the latter; a bushing on the driving end of said setting element, rotatable with said setting element but axially displaceable relative thereto; and second bevel gears each fixed to a respective end of said bushing, the axial spacing of said second bevel gears being greater than the smallest diameter of said first bevel gear.

7. A device for indicating and computing game scores, as claimed in claim 6, including a setting lever coupled to said bushing and projecting through a wall of said housing.

8. A device for indicating and computing game scores, as claimed in claim 1, in which said setting element is divided into a drive section and an indicator setting section, the two sections being coaxial and the drive section being rotatable with the setting section but axially displaceable relative thereto.

9. A device for indicating and computing game scores, as claimed in claim 1, including a pair of said scales, each on a respective opposite wall of said housing and being aligned with each other; said indicator being cooperable with both of said scales.

10. A device for indicating and computing game scores, as claimed in claim 1, including at least two indicators on one only of the scales.

11. A device for indicating and computing game scores, as claimed in claim 1, including plural relatively fixed scales arranged in spaced parallel relation; an adjustable scale on said housing extending substantially parallel to said fixed scales; and a cross indicator extending across all the scales and guided on said housing for parallel displacement relative thereto.

12. A device for indicating and computing game scores, as claimed in claim 1, including plural relatively fixed scales, each associated with a respective indicator, a respective setting element, a respective setting means, a respective counting mechanism, and a respective selectively operable coupling means, said relatively fixed scales extending in laterally spaced parallel relation across a wall of said housing; and a relatively elongated scale carrier extending across said wall of said housing in parallel relation to said relatively fixed scales, means mounting said scale carrier for parallel displacement transversely of said relatively fixed scales; a movable scale, having scale indicia corresponding to said relatively fixed scales, movably mounted on said scale carrier for adjustment longitudinally thereof, said movable scale having a zero reference; a slide selectively displaceable along said movable scale; and plural setting riders, equal in number to said relatively fixed scales, mounted on said scale carrier for adjustment longitudinally thereof and longitudinally of said relatively movable scale.

13. A device for indicating and computing game scores, as claimed in claim 1, including a dealer sequence indicator; stepping means operable to step said dealer sequence indicator to indicate the deal sequence; and means operatively connecting said stepping means to said zero resetting keys.

14. A device for indicating and computing game scores, as claimed in claim 13, in which said dealer sequence indicator is located in said housing and includes plural sequentially visible dealer indicators positioned at respective apertures in said housing.

15. A device for indicating and computing game scores, as claimed in claim 13, in which said dealer sequence indicators include plural dealer indicating lamps of respective different colors; a source of potential; said stepping means comprising at least one stepping switch; circuit means, including said step switch, operable to light said lamps sequentially; normally open stepping switch operating contacts included in said circuit means; and means connecting said stepping switch operating contacts to said zero reset keys for stepping of said stepping switch responsive to actuation of said zero reset keys.

16. A device for indicating and computing game scores, as claimed in claim 13, in which said deal sequence indicator is a rotating disk mounted in said housing for step-by-step angular displacement; said disk being divided into plural substantially equal area color fields of respective different colors; said housing being formed with a sight aperture in a wall thereof having an area substantially equal to the area of one of said color fields.

References Cited

UNITED STATES PATENTS

| | | | |
|---|---|---|---|
| 208,101 | 9/1878 | Kethledge | 235—124 |
| 1,335,596 | 3/1920 | Morison | 235—124 |
| 2,032,304 | 2/1936 | Padgett | 116—135 |
| 2,056,490 | 10/1936 | Skaraas et al. | 116—135 |
| 2,097,835 | 11/1937 | Epps | 116—135 |
| 2,759,666 | 8/1956 | Wyckoff | 116—135 |
| 2,872,814 | 2/1959 | Brown | 235—61 |
| 2,872,815 | 2/1959 | John | 235—61 |
| 3,092,317 | 6/1963 | Viele | 116—135 |

FOREIGN PATENTS 367,335  1/1939  Italy.

RICHARD B. WILKINSON, *Primary Examiner.*

S. A. WAL, *Assistant Examiner.*